United States Patent
Gupta et al.

(10) Patent No.: US 7,201,178 B2
(45) Date of Patent: Apr. 10, 2007

(54) CONTINUOUS CHEMICAL FEEDER AND METHOD OF USE THEREOF

(75) Inventors: Amit Gupta, Aurora, IL (US); David A. Grattan, Bolingbrook, IL (US)

(73) Assignee: Nalco Company, Naperville, IL (US)

( * ) Notice: Subject to any disclaimer, the term of this patent is extended or adjusted under 35 U.S.C. 154(b) by 293 days.

(21) Appl. No.: 10/970,594

(22) Filed: Oct. 21, 2004

(65) Prior Publication Data

US 2006/0086387 A1 Apr. 27, 2006

(51) Int. Cl.
*F16K 11/02* (2006.01)
(52) U.S. Cl. .......................... 137/1; 137/113; 137/256; 137/263; 137/434; 222/67
(58) Field of Classification Search ........... 137/101.25, 137/101.27, 113, 256, 263, 434; 222/65, 222/67
See application file for complete search history.

(56) References Cited

U.S. PATENT DOCUMENTS 2,549,409 A * 4/1951 Atkinson ..................... 137/113
2,557,438 A * 6/1951 Johnson ....................... 137/256
2,570,375 A * 10/1951 Pritchard ................. 137/101.27
3,158,193 A * 11/1964 Anderson ..................... 137/255

* cited by examiner

*Primary Examiner*—Stephen M. Hepperle
(74) *Attorney, Agent, or Firm*—Peter A. DiMattia; Michael B. Martin; Thomas M. Breininger

(57) ABSTRACT

A method of providing a continuous, sequential, and cyclic, if desired, liquid feed to a processor from a plurality of containers, which comprises feeding the liquid from a first of the containers through a first conduit to a reservoir having a float valve, to keep the level of the liquid in the reservoir high enough to maintain the float valve in an upper floating position that closes the float valve. The first conduit is uncontrolled by the float valve. The float valve controls a second conduit which connects with a second container. As liquid is withdrawn from the reservoir for processing, liquid from the first conduit and container replenishes the reservoir until it is exhausted. Then, the liquid level drops, and the float valve opens the second conduit for replenishing the reservoir with liquid from the second container. A crossover valve may be used so that the float valve controls flow from either container connected to the second conduit.

36 Claims, 3 Drawing Sheets

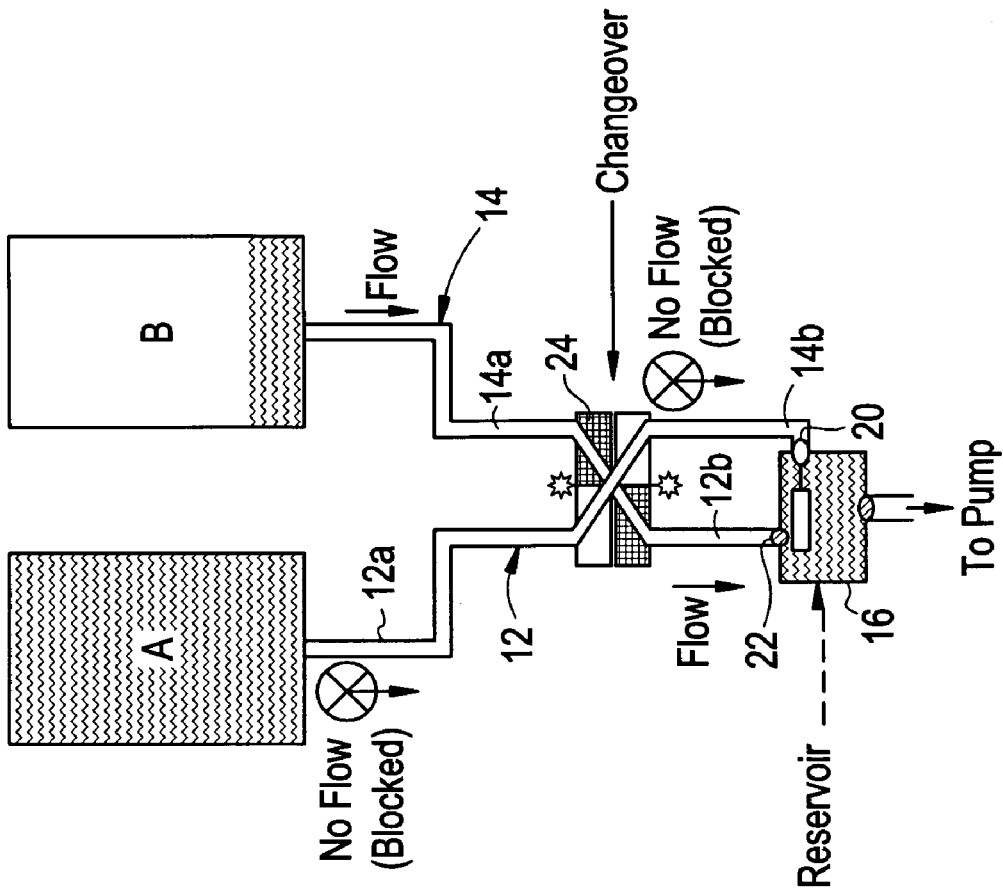
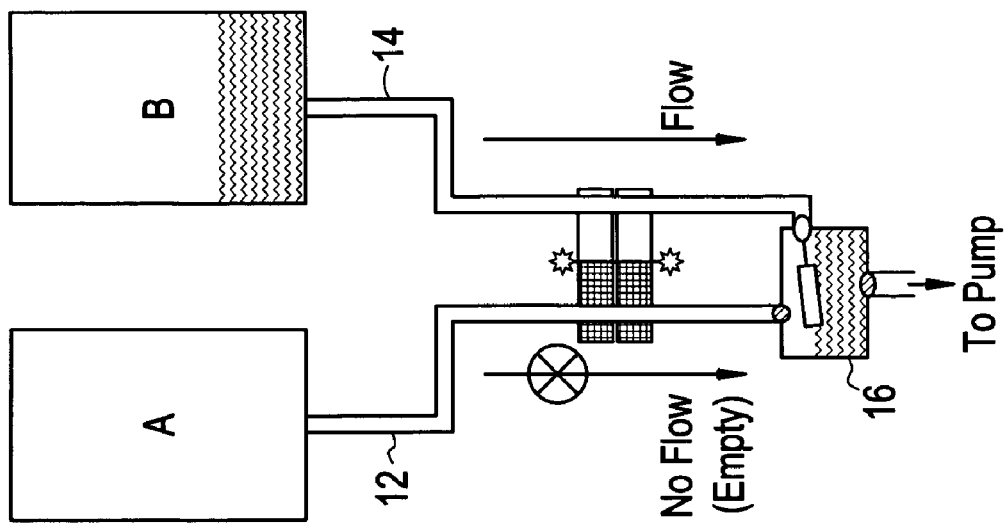

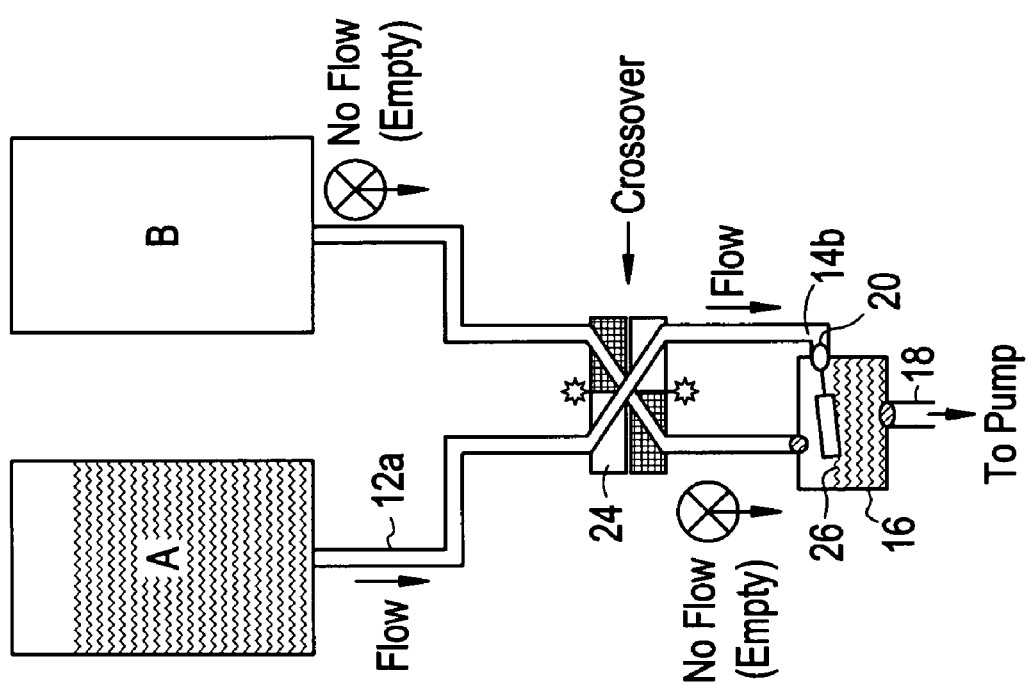

CONTINUOUS CHEMICAL FEEDER AND METHOD OF USE THEREOF

FIELD OF THE INVENTION

The present invention relates to apparatus and method for providing a continuous liquid feed to a processor from a plurality of containers. As a first container is exhausted of the liquid feed, the apparatus and method automatically opens up a second of the plurality of containers, to continuously and sequentially (in cyclic manner if desired) provide the liquid feed to the processor, which typically may be a chemical reactor or other industrial or consumer processing apparatus.

BACKGROUND OF THE INVENTION

The feeding of ingredients and reactants to a processor, such as a chemical reactor, typically utilizes a container which typically stores the chemical feed material, and a pump that provides a metered amount of the chemical from the container to the site of application, such as the chemical reactor.

If a single drum of chemical reactant or ingredient is used, the drum periodically has to be replenished, adding new ingredient or reactant to the old ingredient or reactant remaining in the drum. This may be undesirable in the event of ingredients and reactants that have a short self life or are otherwise unstable. Alternatively, the entire container must be replaced when the ingredient or reactant contained therein is depleted. As such a container is replaced, or needs to be replaced, this can result in a time gap where no ingredient or reactant is being fed to the processor. This may be highly undesirable, because in various process lines and chemical reactions it may be undesirable to interrupt a constant flow of ingredient or reactant.

Also, it may be desired to add a second ingredient or reactant after a container full of a first ingredient or reactant has been depleted.

In all of these situations, it may be desirable to provide two, separate containers, which may contain either the same product or different products for sequential application, as desired.

It is of course known to control the administration of ingredients or reactants from multiple containers by systems which are electrical or electronic, and automated or semi-automated. However, electrical and electronic systems are expensive, and of course require the availability of a power source. Such processes may require a sensor of weight, flow, or the like, that communicates with solenoid valves via a controller for proper flow control. An electrical or non-electrical, automated system can include devices such as vacuum valve switches that can switch from a first to a second container, switching flow from a first to a second container when a vacuum develops in the first container. For example, vacuum switch valves may be routinely used in the delivery of beverages where the syrup from a bag is delivered to a machine, and the delivery system switches to a second bag when the first bag depletes. Such devices are particularly effective under high flow conditions, and where the container size is relatively small so that a partial vacuum that can be sensed develops quickly. Under low flow conditions, and larger containers (larger than 5 gallons), for example, such a system may not be effectively controlled by vacuum switching, since a vacuum pressure high enough to allow such switching may not develop in a timely manner, thus resulting in a disruption of chemical feed.

Manual switching of sequentially used ingredient or reactant containers of course requires the constant monitoring and intervention of an operator or technician to perform the changeover.

In accordance with this invention, a semi-automated system for providing the feed of liquid ingredients or chemical reactants is provided, where, preferably, the system is non-electrical, but which can provide sequential application of one or more ingredients or reactants from a plurality of containers to a processor, such as a chemical reactor or another processing device. The need for manual control can be significantly reduced, permitting the system to be left unattended for extended periods of time. Also, since each of the containers may be sequentially emptied before the next container is opened, product shelf-life management can be effectively maintained. Also, the system may be a low flow system, and may permit sequential feed of different products on a cyclic basis. The system also may be used where product package size is small, for example with sterile product for use in the medical field or elsewhere, with several different containers of ingredient or reactant being used within a short period of time.

Such a system may be usable in numerous, different market areas such as manufacturing, the food and beverage industry, (such as delivery of soda concentrates, ice cream mixes, and the like), boiler treatment, cooling water treatment, processed chemicals, waste water treatment, industrial and domestic water treatment, including swimming pools, the consumer market, and the medical field, as well as in various industries such as mining, pulp and paper, refining, primary metals, automotive, chemical, pharmaceutical, food and beverage, energy, and the like.

DESCRIPTION OF THE INVENTION

A method is disclosed for providing a continuous, sequential, cyclic, if desired, liquid feed to a processor from a plurality of containers. The method comprises:

feeding the liquid from a first of said containers through a first conduit to a reservoir having a float valve, at a liquid flow rate to keep the level of said liquid in the reservoir high enough to maintain the float valve at an upper floating position that closes the float valve, the first conduit being uncontrolled by the float valve;

withdrawing a stream of said liquid from said reservoir for processing;

providing a second of said containers filled with said liquid and connected through a second conduit to said reservoir, said second conduit being connected to said float valve for control of flow therethrough;

replenishing said liquid in the reservoir by liquid from the first container to maintain said liquid level, as liquid is withdrawn from the reservoir, until liquid in the first container is exhausted;

continuing to withdraw a stream of liquid from the reservoir for processing, causing said reservoir liquid level to drop, whereby the float valve opens flow through the second conduit;

optionally, causing a crossover valve to connect an upstream portion of the first conduit with a downstream portion of the second conduit and the float valve, and to connect an upstream portion of the second conduit with a downstream portion of the first conduit, to raise again the liquid level of the reservoir by liquid flow from the second container and to close the float valve, while continuing to withdraw the stream of liquid from the reservoir for processing.

Typically, one may also include the step of either thereafter refilling the first container with more of the liquid, or replacing the first container with another first container which is filled with more of the liquid, or replacing the first container with another container and filling the newly placed container.

In another embodiment, the method described above includes the step of thereafter refilling the first container with said liquid or replacing the first container with another first container filled with said liquid or filling with the said liquid a newly placed container that replaces the first empty container;

continuing to withdraw said stream of liquid from said reservoir for processing;

continuing to replenish said liquid in the reservoir by liquid from the second container to maintain said liquid level that closes the float valve, as liquid is withdrawn from the reservoir, until liquid in the second container is exhausted;

continuing to withdraw a stream of liquid from the reservoir for processing, causing said reservoir liquid level to again drop, whereby the float valve opens flow from the first container through the upstream portion of the first conduit that is connected to the downstream portion of the second conduit, to continue to replenish liquid to the reservoir as the stream of liquid is withdrawn from the reservoir for processing;

and optionally, the further step of causing said crossover valve to once again connect the upstream portion of the first conduit with the downstream portion of the first conduit and to connect the upstream portion of the second conduit with the downstream portion of the second conduit and the float valve to raise again the liquid level of the reservoir by liquid flow from the first container through the first conduit and to close the float valve, while continuing to withdraw said stream of liquid from the reservoir for processing Also, by this invention, devices are disclosed for providing continuous, sequential, cyclic feed of liquid to a processor from a plurality of containers.

The device comprises: a reservoir; a plurality of separate conduits, each connecting the reservoir with one of said plurality of conduits; at least one float valve in said reservoir, said float valve controlling flow through at least a second conduit of said separate conduits, with a first of said separate conduits being uncontrolled by said float valve. The reservoir has an outlet conduit for withdrawing liquid for processing.

Optionally, a crossover valve is also provided, to reversibly connect an upstream portion of the first conduit with a downstream portion of the second conduit and the float valve, and also to reversibly connect an upstream portion of the second conduit with a downstream portion of the first conduit.

In some embodiments, only two separate conduits are present for connecting two of the containers.

In some embodiments, the conduits are positioned to permit gravity flow of the liquid from the containers to the reservoir.

The outlet conduit may be connected to a pump for metering the feed of the liquid reactant or other ingredient to a processor, which processor may be a chemical reactor or a boiler water system or another processing apparatus.

The processor may comprise a device for use in manufacturing, the food and beverage industry, boiler treatment, cooling water treatment, chemical processing, waste water treatment, industrial or domestic water treatment, the consumer market, the medical field, mining, pulp or paper, refining, primary metals, automotive, chemical, pharmaceutical, food or beverage, or energy production or transmission.

In some embodiments, each container may in itself comprise a plurality of containers for prolonged consumption or increased volume.

In some embodiments, the reservoir, containers, conduits, float valve, and crossover valve may be free of electronically operated components.

In some embodiments, the reservoir, containers, and conduits may contain electronically operated valves or switches to ascertain and/or change the flow of the said plurality of conduits.

Furthermore, the first and/or second conduit may carry a one way valve to prevent back flow.

In some embodiments, the crossover valve may not be used, for example, when the liquid does not have a shelf life.

In some embodiments, the reservoir is modified so as to prevent air or vacuum lock, for example, an air vent.

Thus, a method and apparatus are provided, in which sequential delivery of a fluid ingredient or reactant feed may be provided to a processor apparatus, for example, a chemical reactor, in which switching from one container of feed to the next container of feed is automatic, as the first container is exhausted. The system may operate automatically and may require human intervention only at the time of replenishment of the liquid ingredient or reactant. It uses relatively inexpensive components, which are easily modified as desired. The system does not require close, moment-by-moment scrutiny, and can be non-electrical, if desired, so that it operates without the need for electric power, and does not fail when there is a power failure.

DESCRIPTION OF THE DRAWINGS

The drawings are designed to provide a schematic representation of the invention.

In the drawings.

FIG. 3 is a schematic view of the device of FIGS. 1 and 2 in a later stage of the second mode of operation.

FIG. 4 is a schematic view of the device of FIGS. 1–3, after the first container has been refilled or replaced with another container, and crossover flow has been initiated in a third mode of operation. This crossover flow has altered the path of liquid flow and the reservoir port receiving the liquid from said containers.

FIG. 5 is a schematic view of the device of FIGS. 1–4, showing a fourth mode of operation, in which the second liquid supply container (B) has emptied, and the refilled or replaced first liquid supply container automatically begins to provide a liquid feed.

DESCRIPTION OF SPECIFIC EMBODIMENTS

Figure 2:
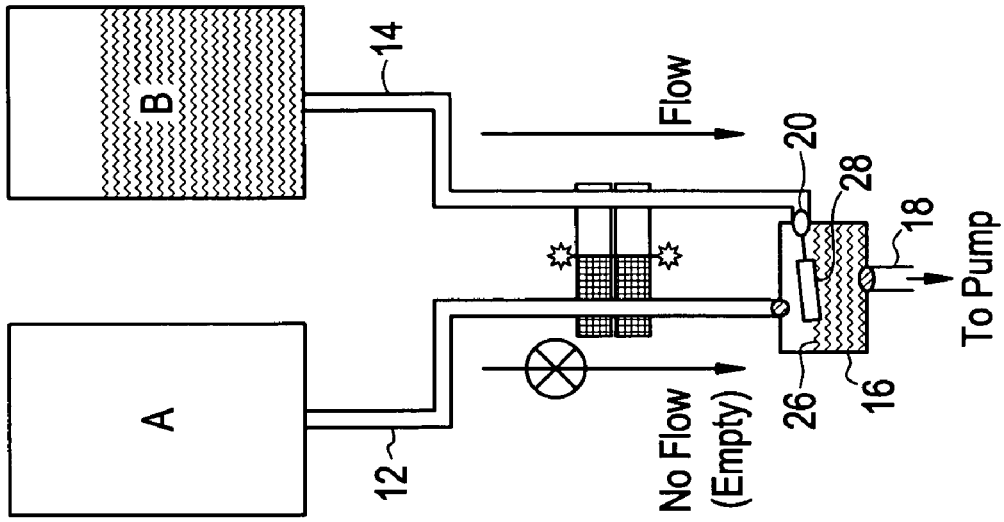
FIG. 2 is a schematic view of the device of FIG. 1 in a second mode of operation, when the first (A) of the liquid supply containers is empty, and liquid feed is being provided by a second (B) of said liquid supply containers.

Referring to the drawings, a liquid feed device 10 is shown which comprises a plurality of containers A, B . . . . Each container may in itself comprise a plurality of containers. Specifically two containers are shown, each being connected to a separate conduit 12, 14, each of which conduits connects to reservoir 16. Reservoir 16 connects to outlet conduit 18, for withdrawing liquid for processing in a chemical reactor or other processor, typically by first passing the liquid through a pump for proper metering of the liquid ingredient or reactant. For example, liquid may pass from reservoir 16, metered by a pump, into a process line, in which the liquid is a reactant, (which may be a catalyst, if desired), or a process additive. Alternatively, the liquid could be metered into another container as an ingredient in a cooking recipe, being stirred in a large container and then, if desired, further passed, mixed with other ingredients, into bottles, cans, or pans, optionally with a cooking step for baking or the like.

Containers A and B may each comprise a plurality of containers, or a permanent, outer container having a replaceable, inner plastic liner that carries the liquid ingredient or reactant, if desired, so that inner plastic liners, when depleted of liquid, may be refilled, replaced with new, filled plastic liners, or liners that can be filled.

Reservoir 16 also contains a float valve 20, which controls flow through conduit 14, but not through conduit 12. Conduit 12 may, if desired, be controlled by one-way valve 22, which permits flow from conduit to reservoir 16, but does not allow flow in the opposite direction.

Finally, changeover valve or crossover valve 24 is provided, to switch flow paths in a manner shown below.

Figure 1:
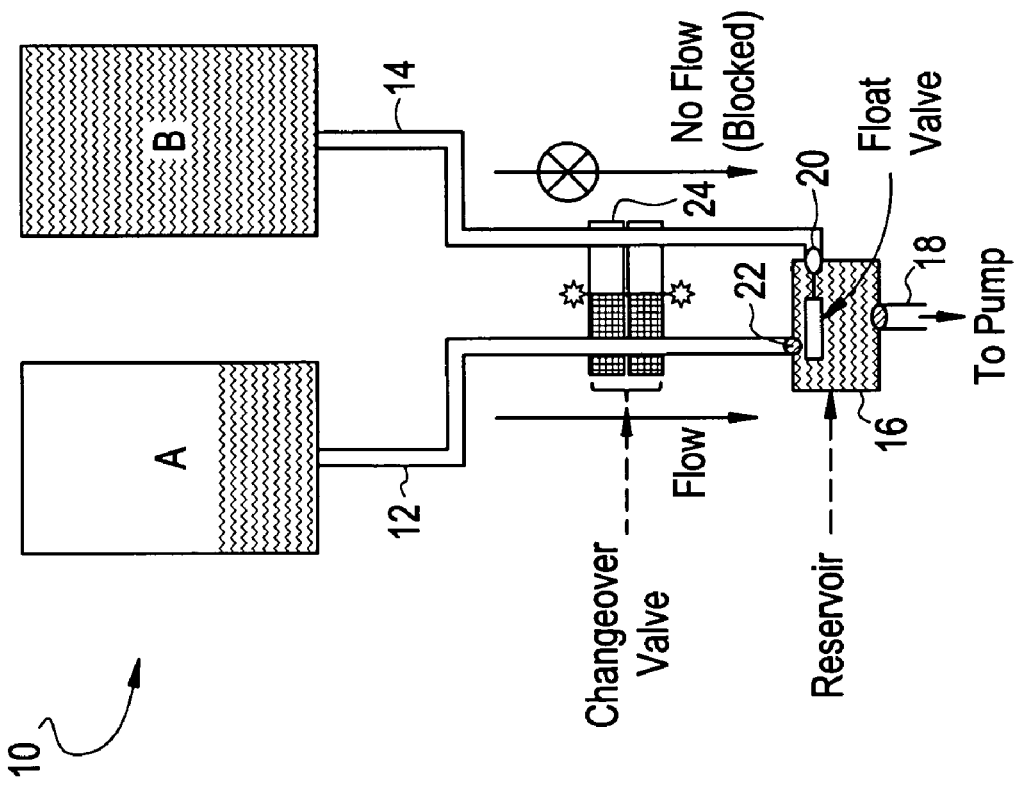
FIG. 1 is a schematic view of the device of this invention in a first operating mode, when liquid feed is being provided from a first (A) of two liquid supply containers (A and B).

In FIG. 1, flow of liquid ingredient or reactant passes out of reservoir 16 through outlet conduit 18 to a pump (continuous or intermittent), or directly to a processor, with the liquid being replaced in reservoir 16 by gravity flow from container A through conduit 12. This proceeds until container A is emptied, as in FIG. 2. Then, with continued flow of fluid from reservoir 16 through outlet conduit 18, the liquid level 26 in reservoir 16 drops, as shown in FIG. 2. The float 28 of float valve 20 moves downwardly with the lowering liquid level, which opens flow through conduit 14, which connects to container B. Thus, as FIG. 2 shows, container B begins to drain by gravity flow, by the passage of its liquid contents through conduit 14 into reservoir 16. Liquid level 26 remains lower in the mode of FIG. 2 than it was in the mode of FIG. 1, because when the liquid level starts to rise, flow through conduit 14 is restricted by the action of float valve 20, providing an equilibrium liquid level in reservoir 16 in the FIG. 2 mode of operation which is lower than it was in reservoir 16 in the FIG. 1 mode of operation.

As shown in FIG. 3, this situation continues as container B continues to drain. Container A can be refilled or replaced as flow proceeds from container B, as shown in FIG. 4.

It is at this general time that an intervention from outside of the disclosed system is needed. Typically, this intervention is the manual intervention of an operator, who can generally predict when the moment of near exhaustion of the contents of container B will arrive. As also shown in FIG. 4, the operator switches changeover or crossover valve 24, so that the upstream portion 12a of the first conduit becomes connected with the downstream portion 14b of the second conduit, and the upstream portion 14a of the second conduit becomes connected with the downstream portion 12b of the first conduit, instead of their previous connection relation as in FIGS. 1–3. Now, container B is subject to a flow restriction that is limited only by the capacity of reservoir 16 and one-way valve 22, so reservoir 16 refills again to essentially its original level of FIG. 1, as container B continues to drain.

New or newly filled container A, on the other hand, now in FIG. 4 has a flow connected to downstream conduit 14b, the flow from which is controlled by float valve 20. Thus, in FIG. 4, the high liquid level in reservoir 16 prevents flow from container A through conduit 12a, 14b until the contents of container B are exhausted. Then, as shown in FIG. 5, the liquid level 26 starts to drop again when container B is exhausted, because there is no replenishment of liquid coming to reservoir 16, until float valve 20 is opened by the dropping liquid level, causing flow from container A to begin to pass through conduit 12a, 14b, to raise liquid level 26.

At this general time, container B may be replenished, either by refilling or replacement, and crossover valve 24 may be switched back to the original configuration of FIG. 1, to complete a cycle of the process of this invention. Thereafter, the process may continue in a similar, cyclic manner, if desired.

In both the case of container A and container B, they may be replaced at an appropriate time, and at that moment the crossover valve may be switched at the same time, without regard to where the liquid level in the respective container A or container B is. In other words, as container A is being replaced in FIG. 2 or 3, the crossover valve may be switched. Then, as container B is replaced in FIG. 5, the crossover valve 20 may be switched back again.

Thus, an apparatus and a method is provided in accordance with this invention for reliable, sequential, and cyclic, if desired, continuous feed of a liquid to a processor from a plurality of containers. In the specific embodiment, the apparatus is free of any need for electrical power, so it can operate with high reliability. It's components are individually well known, commercially available, and rather inexpensive.

If desired, each of the first and second containers A, B may comprise ganged containers, multiply connected, for increased fluid volume. Also, if desired, third, fourth, and added containers may be provided, each being separately connected to another conduit that connects to the reservoir, each being controlled by separate float valves, placed at different levels in the reservoir, so that differing liquid levels will respectively open differing float valves, permitting a larger plurality of the containers to become sequentially emptied, and lengthening the time between required maintenance periods of the system. Also, while a float valve is specifically disclosed, any liquid level, flow volume, or a weight actuatable valve, such as a valve operated by optical or infra red liquid level sensors, or other electronic valves, may be used in this invention as an equivalent to the float valve particularly referred to, and is intended to be included in the phrase "float valve". As stated above, the contents of containers A, B, and any other containers may be the same or different, as desired.

The above has been offered for illustrative purposes only, and is not intended to limit the scope of the invention of this application, which is as defined in the claims below.

The invention claimed is:

1. A method of providing a continuous, sequential, liquid feed to a processor from a plurality of containers, which comprises:

feeding said liquid from a first of said containers through a first conduit to a reservoir having a float valve at a liquid flow rate to keep the level of said liquid in the reservoir high enough to maintain the float valve at an upper floating position that closes the float valve, the first conduit being uncontrolled by the float valve;

withdrawing a stream of said liquid from said reservoir for processing;

providing a second of said containers filled with said liquid and connected through a second conduit to said reservoir, said second conduit having flow therethrough controlled by said float valve;

replenishing said liquid in the reservoir by liquid from the first container to maintain said liquid level as liquid is withdrawn from the reservoir, until liquid in the first container is exhausted;

continuing to withdraw a stream of liquid from the reservoir for processing, causing said reservoir liquid level to drop, whereby the float valve opens flow through the second conduit to replenish liquid in the reservoir;

causing a crossover valve to connect an upstream portion of the first conduit with a downstream portion of the second conduit and the float valve, and to connect an upstream portion of the second conduit with a downstream portion of the first conduit, to raise again the liquid level of the reservoir by liquid flow from the second container uncontrolled by the float valve, and to close the float valve, while continuing to withdraw said stream of liquid from the reservoir for processing.

2. The method of claim 1 including the step of thereafter refilling the first container with said liquid.

3. The method of claim 1 including the step of thereafter replacing the first container with another container filled with said liquid.

4. The method of claim 1 including the step of thereafter replacing the first container with another container and filling the newly placed container.

5. The method of claim 1 including the step of thereafter refilling the first container with said liquid or replacing the first container with another first container filled with said liquid or filling with the said liquid a newly placed container that replaces the first empty container;

continuing to withdraw said stream of liquid from said reservoir for processing;

continuing to replenish said liquid in the reservoir by liquid from the second container to maintain said liquid level that closes the float valve, as liquid is withdrawn from the reservoir, until liquid in the second container is exhausted;

continuing to withdraw a stream of liquid from the reservoir for processing, causing said reservoir liquid level to again drop, whereby the float valve opens flow from the first container through the upstream portion of the first conduit that is connected to the downstream portion of the second conduit, to continue to replenish liquid to the reservoir as the stream of liquid is withdrawn from the reservoir for processing.

6. The method of claim 5 comprising the further step of causing said crossover valve to once again connect the upstream portion of the first conduit with the downstream portion of the first conduit and to connect the upstream portion of the second conduit with the downstream portion of the second conduit and the float valve to raise again the liquid level of the reservoir by liquid flow from the first container through the first conduit and to close the float valve, while continuing to withdraw said stream of liquid from the reservoir for processing.

7. The method of claim 1 in which liquid is fed from the first and second containers to the reservoir by gravity.

8. The method of claim 1 in which liquid is withdrawn from said reservoir to a pump for metering said continuous, sequential liquid feed to a processor.

9. The method of claim 1 in which said processor is a chemical reactor.

10. The method of claim 1 in which said processor is a process, for example a boiler water system.

11. The method of claim 1 in which said processor comprises a device for use in manufacturing, the food and beverage industry, boiler treatment, cooling water treatment, chemical processing, waste water treatment, industrial or domestic water treatment, the consumer market, the medical field, mining, pulp or paper, refining, primary metals, automotive, chemical, pharmaceutical, food or beverage, or energy production or transmission.

12. The method of claim 1 in which said containers, reservoir, conduits, float valve, and crossover valve are free of electrically operated components.

13. The method of claim 1 in which said containers, reservoir, conduits, may contain electronically actuated switches or valves for maintenance of liquid level or flow path.

14. A device for providing continuous, sequential feed of liquid to a processor from a plurality of containers, which comprises:

a reservoir;

a plurality of separate conduits, each connecting the reservoir with one of said plurality of containers;

at least one float valve in said reservoir, said float valve controlling flow through at least a second conduit of said separate conduits, with a first of said separate conduits being uncontrolled by said float valve;

said reservoir having an outlet conduit for withdrawing liquid for processing; and a crossover valve to reversibly connect an upstream portion of the first conduit with a downstream portion of the second conduit and the float valve, and also to reversibly connect an upstream portion of the second conduit with a downstream portion of the first conduit.

15. The device of claim 14 in which only two of said separate conduits are present for connecting two of said containers.

16. The device of claim 14 in which said conduits are positioned to permit gravity flow of said liquid from the containers to the reservoir.

17. The device of claim 14 in which said outlet conduit is connected to a pump for metering said feed of liquid to a processor.

18. The device of claim 17 in which the processor is a chemical reactor.

19. The device of claim 17 in which said processor is a boiler water system.

20. The device of claim 17 in which said processor comprises a device for use in manufacturing, the food and beverage industry, boiler treatment, cooling water treatment, chemical processing, waste water treatment, industrial or domestic water treatment, the consumer market, the medical field, mining, pulp or paper, refining, primary metals, automotive, chemical, pharmaceutical, food or beverage, or energy production or transmission.

21. The device of claim 14 in which said reservoir, containers, conduits, float valve, and crossover valve are free of electrically-operated components.

22. The device of claim 14 in which said containers, reservoir, conduits, may contain electronically actuated switches or valves for maintenance of liquid level or flow path.

23. The device of claim 14 in which said first conduit carries a one-way valve to prevent back flow.

24. The device of claim 14, in which the sequential liquid feed is cyclic.

25. The device of claim 14 in which said conduits are positioned to permit gravity flow of said liquid from the containers to the reservoir, and in which said outlet conduit is connected to a pump for metering said feed of liquid to a processor.

26. The device of claim 25 in which said processor is a chemical reactor.

27. The device of claim 25 in which said processor is a boiler water system.

28. The device of claim 25 in which said reservoir, containers, conduits, float valve and crossover valve are free of electrically-operated components.

29. The device of claim 25 in which said containers, reservoir, conduits, may contain electronically actuated switches or valves for maintenance of liquid level or flow path.

30. The device of claim 25 in which said first conduit carries a one-way valve to prevent back flow.

31. The method of claim 1, in which the sequential liquid feed is cyclic.

32. The method of claim 1 in which said first conduit carries a one-way valve to prevent back flow.

33. The method of claim 1 in which said reservoir is modified to prevent air or vacuum lock.

34. The method of claim 1 in which said reservoir has an air vent.

35. The device of claim 14 wherein said reservoir is modified to prevent air or vacuum lock.

36. The device of claim 14 wherein said reservoir has an air vent.

* * * * *